UNITED STATES PATENT OFFICE.

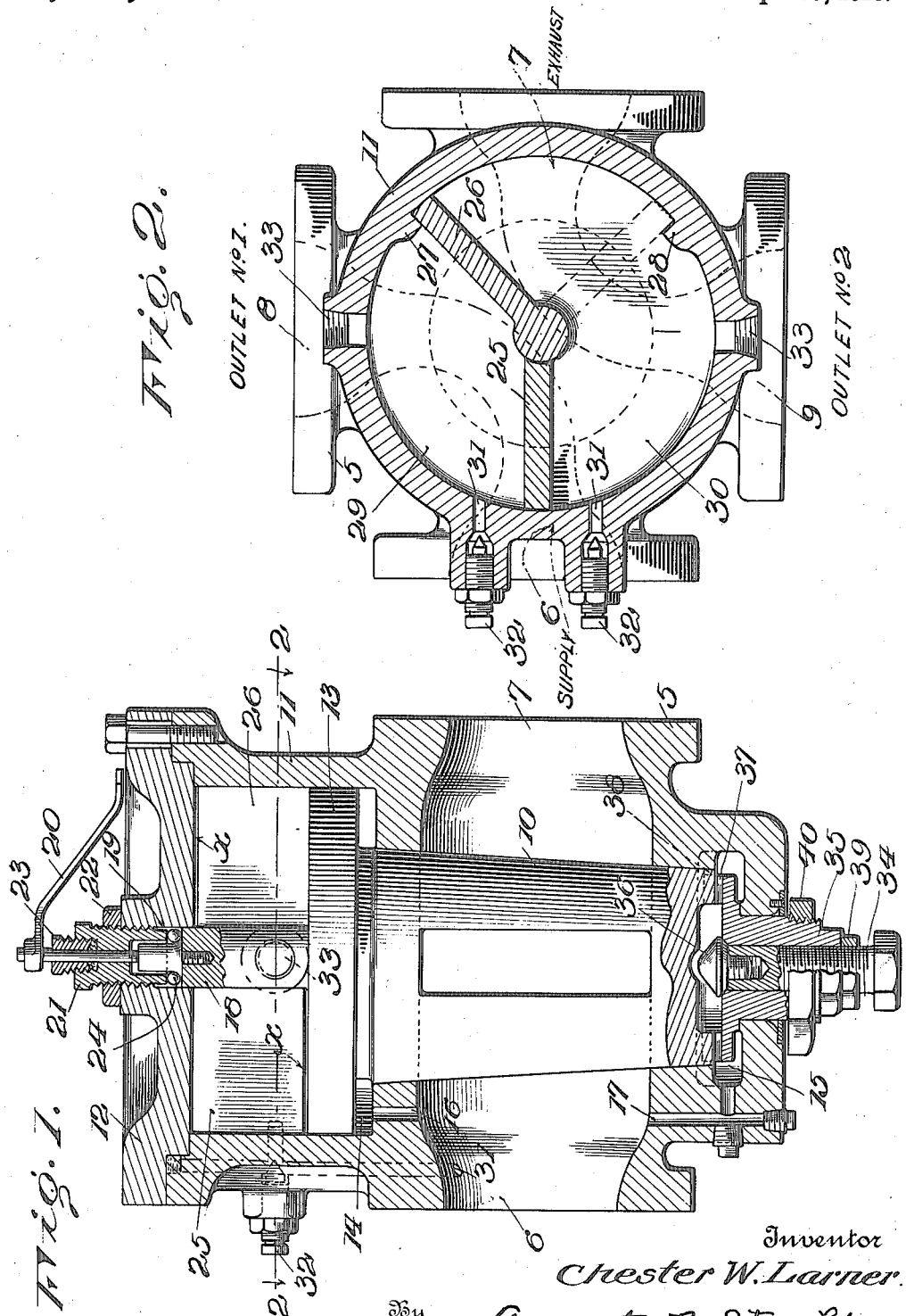

CHESTER W. LARNER, OF CLEVELAND, OHIO.

TAPER-PLUG VALVE.

1,263,778.　　　　　Specification of Letters Patent.　　Patented Apr. 23, 1918.

Application filed September 4, 1917. Serial No. 189,532.

*To all whom it may concern:*

Be it known that I, CHESTER W. LARNER, a citizen of the United States, residing at Cleveland, in the county of Cuyahoga and State of Ohio, have invented certain new and useful Improvements in Taper-Plug Valves, of which the following is a specification.

This invention relates to multiple-way and straight-way valves for controlling the transmission of gases and fluids under pressure, and more particularly to taper plug valves of the balanced type.

One of the principal objects is to improve the general construction of the valve; to provide for relieving the wedging action thus making the plug easy to turn; and to provide for turning or operating it by the pressure of the gas or fluid in the pipe line in which it is installed, or by the pressure of gas or fluid supplied from an independent source, or by mechanical or electro-magnetic devices constructed and operated in a manner well understood.

Other objects, features and advantages will be pointed out in the course of the following description taken in connection with the accompanying drawing, forming a part hereof, wherein—

Figure 1 is a sectional elevational view of a taper plug valve constructed in accordance with my invention.

Fig. 2 is a section on line 2—2 of Fig. 1.

The drawing illustrates a four-way valve, but the improvements are equally applicable to straight-way valves.

5 designates a shell or casing having supply and exhaust passages 6 and 7 and complemental outlets 8 and 9. 10 is a taper plug ported as usual for controlling the distribution of flow through the valve casing and having a wedge fit in the plug bore thereof. The casing is provided with an upwardly directed cylindrical extension 11, which together with its cap 12 forms a chamber for fluid pressure. The large end of the plug is provided with a flange or collar 13, which divides said chamber into upper and lower compartments, whereof the lower compartment or chamber 14 receives pressure for plug balancing and lifting purposes. Below the plug there is a pressure balancing chamber 15. The chambers 14 and 15 are provided, respectively, with ports 16 and 17 communicating with the pressure passage 6. Evidently, whenever there is pressure in the pipe line there is pressure in said chambers.

The plug stem 18 is accommodated in a central opening 19 in the cap 12, and carries an indicator arm 20. The opening is closed by an adjusting screw 21, its lock nut 22 and by a small stuffing box 23. Between the adjusting screw 21 and a shoulder on the stem there is a series of anti-friction balls 24 to take the thrust without undue friction.

The covering plate or cap 12 is provided with a depending radial partition, wing or abutment 25, and the collar 13 is provided with a corresponding upstanding abutment 26. The abutment 25 on the cap is, of course, stationary, since the cap is fixed to the casing. The abutment 26 rotates with the plug and at each end of its travel encounters stops 27 and 28 on the valve casing. The plug abutment has a clearance of say one-sixteenth of an inch with the inside surface of the cap, and the abutment on the latter has the same clearance with respect to the top surface of the flange or collar 13, the clearances being indicated at $x$. These clearances permit the plug to rise slightly from its fit in the taper bore of the valve casing, thus relieving the wedging action and making the plug easy to turn.

The plug may be turned or operated by the pressure of the gas or fluid in the pipe line in which it is installed or by the pressure of gas or fluid supplied from an independent source, or in any other suitable way. In the present embodiment it is operated by pressure supplied from the pipe line. For example, the chambers 29 and 30 formed on either side of the fixed abutment 25, are provided with ports 31 adapted and arranged for communication with the main supply passage 6. The ports 31 are equipped with needle valves 32 by means of which the flow may be throttled to any desired extent.

The operating chambers 29 and 30, are provided with outlets 33, which may be controlled either by small hand operated valves or by, for example, electrically operated valves if the plug valve is to be operated from a remote point. Such auxiliary devices being well known and of obvious construction it has not been deemed necessary to show them.

The lower end of the casing is equipped with an adjusting screw 34, which extends through a plug 35 and may be used either to unseat the taper plug or to be so adjusted together with its centering point 36 as to act as a thrust bearing and to prevent the plug from wedging too tightly. The plug 35 is provided with lugs 37, which engage lugs 38 on the small end of the taper plug. By turning plug 35 with a wrench, the taper plug may be correspondingly turned in case the regular system of operation is out of commission. These two sets of lugs are, however, so placed that when plug 35 is set at mid-position, it does not interfere with the operation of the taper plug by means of the rotating abutment. 39 and 40 indicate jam or lock nuts for, respectively, the adjusting screw 34 and plug 35.

In the present embodiment, the supply is shown connected with outlet No. 1, and the exhaust with outlet No. 2. If, now, it is desired to operate the valve and reverse these connections, or, if in the case of a straight-way valve it should be desired to close it from the open position, or vice-versa, the auxiliary valve (not shown) in the outlet 33 on the opposite side of the operating chamber from that toward which the rotating wing or abutment is turned, is opened. The pressure in that side of the operating chamber immediately drops because the pressure inlet is throttled and the area of inlet is very much less than the area of outlet. In addition to this, the pressure in the other chamber drops somewhat on account of leakage through the clearance spaces $x$. The pressure in chambers 14 and 15, however, is not reduced and the result, therefore, is that the taper plug is lifted from its seat until the clearance spaces $x$ are closed or substantially closed. The taper plug having thus been unwedged is free to turn and does turn due to the pressure on the wing or abutment 26, which swings around until it encounters the stop at the other end of its stroke. The auxiliary valve controlling the outlet 33 is then closed, whereupon the pressure builds up again to normal in the operating chamber and forces the plug back to its original position, wedging it in the taper bore and eliminating all leakage between the several ports of the valve casing.

The force tending to seat the plug is equal to the operating pressure multiplied by the difference between the diameter of the plug at the large end and the diameter at the small end. The force tending to seat the plug, the force tending to unseat the plug, and the force tending to rotate the plug, may all be varied to suit the conditions of operation by varying the taper of the plug and the diameter and length of the cylindrical operating chamber between the plug and the cap.

The indicator arm 20 is useful to show the position of the taper plug locally or to indicate its position at some distant point electrically.

Having thus described my invention, what I claim is—

1. The combination in a valve of the type recited, of a rotary taper plug and its complemental casing, means for relieving the wedging action of the plug, and means for turning it with fluid pressure.

2. The combination in a valve of the type recited, of a rotary taper plug and its complemental casing, pressure operated means for unwedging the plug, pressure operated means for turning it, and pressure operated means for re-wedging it.

3. The combination in a valve of the type recited, of a rotary taper plug and its complemental casing, means for relieving the wedging action of the plug, means for turning it with fluid pressure, and means for effecting manual adjustments thereof.

4. The combination in a valve of the type recited, of a rotary taper plug and its complemental casing, means for relieving the wedging action of the plug, means for turning it with fluid pressure, and an arm for indicating the position of the plug and constituting means for turning it manually.

5. The combination in a valve of the type recited, of a rotary taper plug having its large end provided with an annular flange or collar, a valve casing having a chambered part to receive said collar and equipped with pressure inlets and outlets, an abutment on the collar, and means for relieving the wedging action of the plug whereby it may be turned in response to pressure applied to the abutment.

6. The combination in a valve of the type recited, of a rotary taper plug whereof one end is provided with a radial wing or abutment, a valve casing having a chamber for said abutment provided with pressure inlets and outlets, and means for relieving the wedging action of the plug whereby it may be turned in response to pressure applied to the abutment.

7. The combination in a valve of the type recited, of a rotary taper plug having its large end provided with an endwise directed wing or abutment, a valve casing having a chamber for said abutment with pressure inlets and outlets, means for manipulating them to shift the abutment, and pressure balancing chambers at both ends of the plug.

8. A valve of the type recited, comprising the combination of a taper plug capable of rotary and also endwise movement, its casing having an offset pressure chamber provided with a cap, abutments in said chamber whereof one is fixed to the cap and the other is carried by the plug and each having a clearance space to admit of endwise movement of the plug, complemental stops for the plug abutment, and pressure supply and discharge connections for operating the last mentioned abutment.

In testimony whereof I affix my signature in the presence of two witnesses.

CHESTER W. LARNER.

Witnesses:
 FRANK REED,
 L. M. SMYTH.